CALL PROGRESS SIGNAL DETECTOR FOR SWITCHING SYSTEMS

Filed May 24, 1966 Sheet 1 of 2

INVENTOR
G. MINCHENKO
BY
Brendan A. Ward
ATTORNEY

United States Patent Office 3,454,720
Patented July 8, 1969

3,454,720
CALL PROGRESS SIGNAL DETECTOR FOR SWITCHING SYSTEMS

George Minchenko, Reynoldsburg, Ohio, assignor to Bell Telephone Laboratories, Incorporated, Berkeley Heights, N.J., a corporation of New York Filed May 24, 1966, Ser. No. 552,567
Int. Cl. H04m 3/24, 3/26
U.S. Cl. 179—84 10 Claims

ABSTRACT OF THE DISCLOSURE

A telephone call progress signal detector employs the over-all period length of the incoming tone structure as the criterion for interpolation of all incoming signals. The incoming signal is converted into a series of unidirectional pulses whose period length is compared with an internal standard. A pulse arriving in a time slot which is a multiple of 500 milliseconds is recognized as periodic in nature and therefore a line busy or overflow signal, respectively. Any pulse arriving in another time slot is recognized as aperiodic in nature and is therefore deemed to be a voice announcement. Where the initial pulse indicates a periodic signal, a delay is introduced to confirm that the signal is not in fact an aperiodic signal which coincidentally appears in the periodic time slot.

Figure 1:
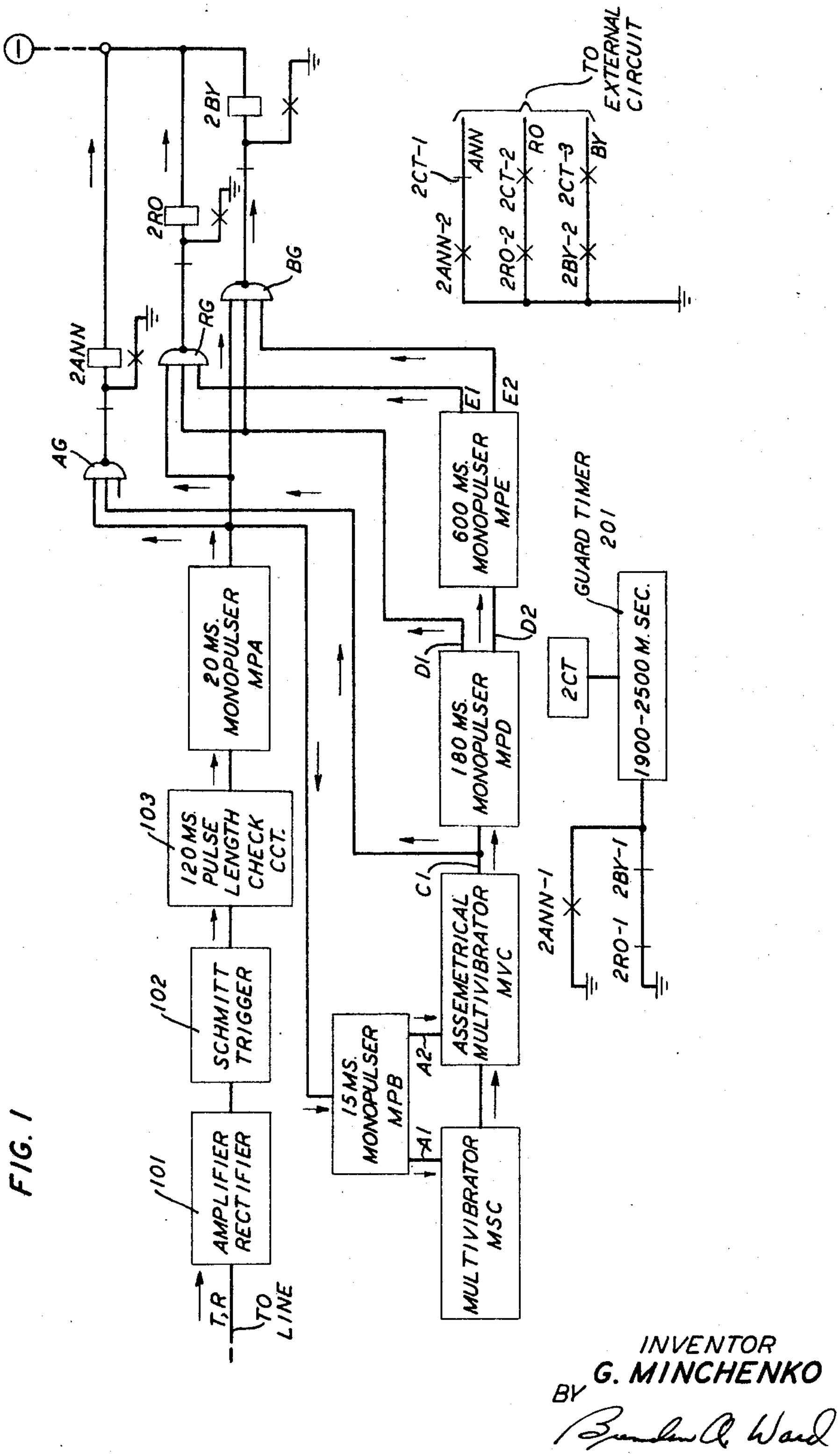

This invention relates to switching systems and particularly to the detection of call progress signals within such systems. More particularly, this invention relates to apparatus for detecting and identifying call progress signals wherein the over-all period length of the signal tone structure is used as the only criterion for the interpretation of all such signals.

One of the earliest problems encountered in the development of automatic switching systems was the provision of means for advising a telephone customer of the progress of a calling connection. As is presently well known in the art, the problem was solved by providing a unique coded pattern of tone signals to indicate each one of a variety of calling conditions. Thus, for example, line busy tone is manifested by a periodic succession of tone and no tone intervals repeated at the rate of 60 impulses per minute. Similarly, an overflow condition (i.e., all trunks busy) is manifested by a periodic succession of tone and no tone intervals repeated at the rate of 120 interruptions per minute. More recently, audible announcements have also been provided in order to indicate an extensive range of call progress conditions, such as a nonworking number or delay in call completion. It is, of course, obvious that an audible announcement is constituted by a succession of signals which are not periodic in nature.

The foregoing call progress signals were designed to be detected and recognized by a human operator. However, the ever-increasing automation of switching systems has led to a need for detection and recognition of such signals by automatic facilities. For example, application Ser. No. 282,926, filed May 24, 1963 by P. J. Germond, J. C. Laswell and D. T. Seward, now U.S. Patent No. 3,270,143 issued Aug. 30, 1966, sets forth an arrangement for indicating to a connected data machine the significance of call progress signals encountered after automatic dialing by the data machine. Recognition of a particular calling connection condition thereby enables the preprogrammed data machine to take the necessary subsequent action. Thus, a calling connection may be repeated upon the recognition that a line busy condition has been encountered, or, the call may be temporarily abandoned where audible ringing is received and not followed by interruption of such ringing within a reasonable interval.

While the Germond et al. patent satisfactorily provides a solution applicable for the detection of a majority of the call progress signals normally encountered, the ever-increasing accessibility of remote areas via direct distance dialing has resulted in the encountering of an entirely new set of technological problems.

Among the problems that have been noted are that many switching centers employ nonstandard frequencies for the signal tones. In addition, extreme variations in the On-and-Off structure of overflow, busy and reorder signals from one operating area to another have led to the conclusion that the use of the length of the silent interval between tones is not entirely satisfactory as a criterion for identification purposes. This conclusion is based upon the fact that, although the interruption rate of the signals (i.e., 60 i.p.m.) may well be within acceptable limits, the length of the silent interval between tones fluctuates widely from one switching center to another.

Also, as earlier noted, a commonly encountered call progress "signal" is an aduible announcement indicating, for example, a delay in establishing the connection or a nonworking number. In this latter instance the automatic detection of an audible announcement is made more difficult by the fact that the signal constitutes a randomly distributed event. Thus, in contrast to a line busy or overflow signal, the announcement signal is inherently aperiodic in nature, although certain component parts of the signal may occur coincidentally at periodic intervals.

Accordingly, it is an object of this invention to distinguish an audible announcement from other call progress signals in a simple and expeditious manner.

It is another object of this invention to distinguish among the several call progress signals generated in switching centers without reference to the length of their respective cyclical tone-off intervals.

It is another object of this invention to detect a randomly distributed event, such as the envelope of speech, from a signal comprising a random-periodic mixture in such a manner as to provide a highly reliable method for distinguishing voice announcements from truly periodic call progress signals.

It is a still further object of this invention to distinguish among the various call progress signals without reference to the particular frequency of such signals.

These and other objects of the invention are attained in accordance with an exemplary embodiment wherein a signal on the incoming line is converted into a series of uniform direct current pulses whose period length is compared with an internally generated standard.

After the rejection of all pulses of less than a predetermined length, the incoming signal, whether manifesting an audible announcement or a series of periodic tone signals, is converted into a series of uniform pulses which are routed via a common bus to the respective inputs of three independent AND-NOT gates, each respectively operative to indicate an audible announcement, a 60 i.p.m. signal, or a 120 i.p.m. signal.

The initial pulse enables an asymmetrical multivibrator having a period of oscillation equal to 540 milliseconds and arranged to partially enable the gate associated with the audible announcement indication during the initial 360 milliseconds of each oscillatory period.

Each of the other gates have a gate controlling monopulser respectively associated therewith which are arranged in a monopulser chain. The beginning of the subsequent 180 millisecond oscillatory period of the multivibrator starts sequential operation of the gate controlling monopulsers. A pulse arriving in a time slot which is a multiple of 500 milliseconds is recognized by the logic circuitry, formed by the interconnection of the monopulsers and associated gates, as periodic in nature and therefore line busy or overflow, respectively. Any pulse arriving in a time slot which is not a multiple of 500 milliseconds is recognized by the logic circuitry as aperiodic in nature and, therefore, is identified as a voice announcement.

However, where the initial pulse indicates a periodic signal, a guard circuit is enabled so as to introduce a delay to permit detection of further line signals and thus confirm that such indication is not caused by an aperiodic signal (audible announcement) which coincidentally appears initially in the predetermined periodic time slot.

A feature of my invention is the provision of a signal detection and identification circuit operable to detect and identify incoming signals in the audio range having a tone-on and tone-off structure of a periodic nature wherein the identification is accomplished independently of the relative length of the tone-off component of the signal.

Another feature of my invention is the provision of a signal detection and identification circuit operable to detect and identify incoming signals in the audio range having a periodic nature wherein the identification is accomplished independently of the particular audio frequency of the incoming signal.

A further feature of my invention is the provision of a signal detection and identification circuit operable to distinguish various incoming signals having a periodic nature and also arranged with a timing device operable to distinguish an incoming aperiodic signal from such periodic signals despite the presence of periodic components in the aperiodic signal.

Figure 2:
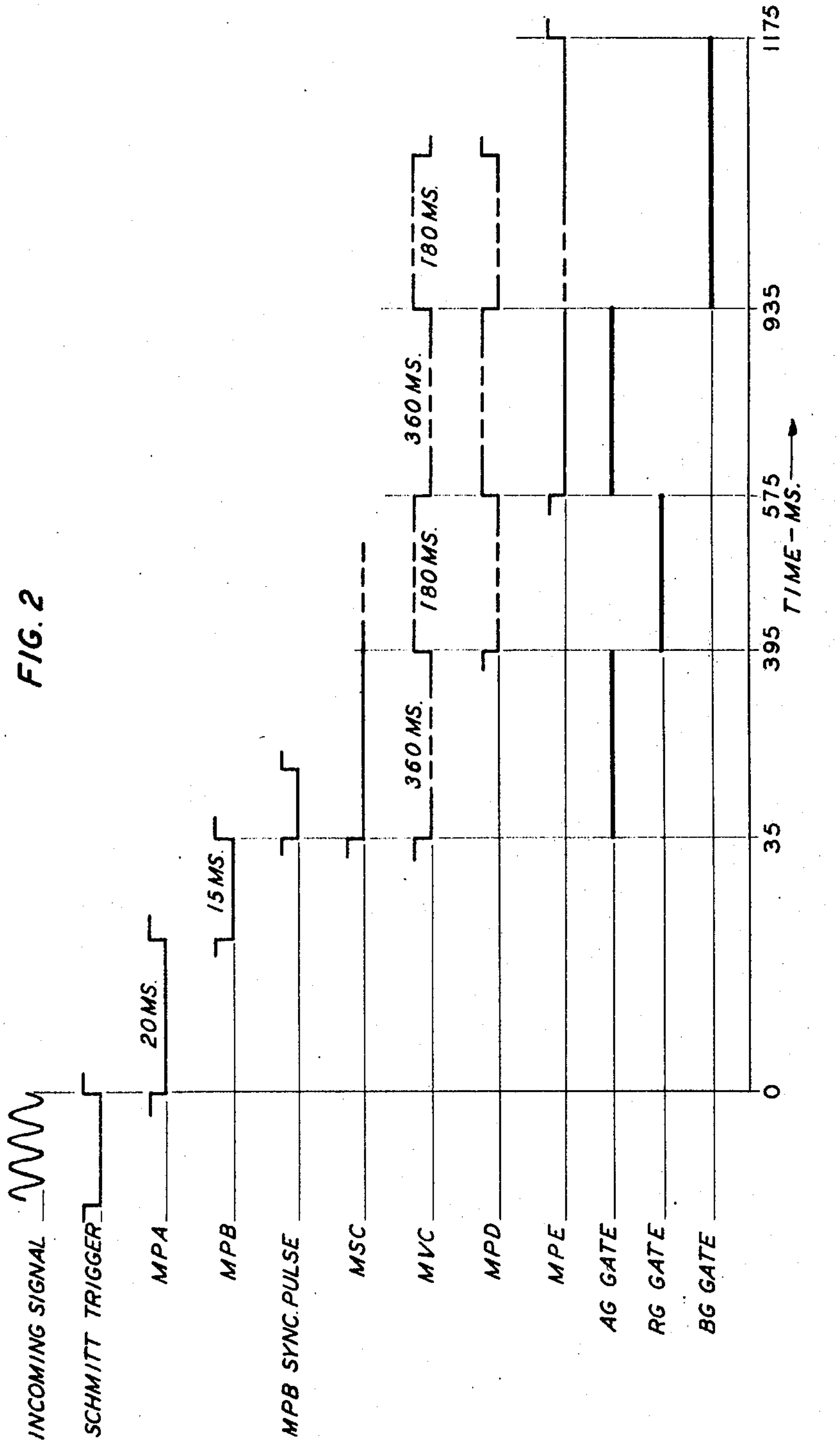

The foregoing and other objects, advantages, and features of this invention will be more clearly understood by the reading of the following description of an exemplary embodiment thereof shown in the drawing, in which:

FIG. 1 shows the interrelationship of the various components of the exemplary embodiment; and FIG. 2 is a state sequence chart graphically displaying the sequential operation of the various components of the embodiment.

It will be noted that FIG. 1 employs a type of notation referred to as "detached-contact" in which an "X" represents a normally open contact of relay and a bar shown intersecting a conductor at right angles represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

Circuit description

For purpose of the description we shall assume that a calling connection has been initiated (via equipment not shown) and that the apparatus of FIG. 1 is presently associated with the calling line via the T and R conductors.

After being amplified and converted into D-C by amplifier-rectifier 101, the incoming signal controls Schmitt trigger stage 102. The output of the Schmitt trigger is advantageously arranged to change its potential from near 0 to about −20 volts whenever the input signal approaches a predetermined level, such as −30 dbm. Therefore, the output of Schmitt trigger 102 consists of a series of negative D-C pulses whose length closely approximates the envelope of the A-C signal pulses appearing at the input on the T and R leads of amplifier-rectifier 101. The output pulses from Schmitt trigger circuit 102 are checked for their length by pulse length check circuit 103 which rejects all events of less than 120 milliseconds duration, thereby preventing the passage of all short pulses produced by switching transients or bursts or spurious noise from ever reaching the rest of the circuit where they could cause erroneous interpretation of the incoming signal. The trailing edges of those pulses sufficiently long to pass through pulse length check circuit 103 trigger monopulser MPA, thus generating a 20 millisecond negative pulse with approximately 20 volt amplitude for each "valid" burst of tone on the T and R conductors at the input of the detector.

The incoming signal is thus converted by monopulser MPA into a series of uniform pulses which are routed via a common bus to one of the inputs of each of three separate 3-input AND-NOT gates AG, RG, and BG. Each of the MPA pulses also generates a 15 millisecond coincidence delay pulse in monopulser MPB. The first MPB pulse activates multivibrator start control circuit MSC via conductor A1. MSC, when triggered, removes blocking potential from the free running asymmetrical multivibrator circuit MVC, thus causing an immediate change of state in the MVC output on lead C1 from ground to −20 volts. Multivibrator circuit MVC is arranged as well known in the art such that the aforesaid condition persists for 360 milliseconds, reverses itself for the next 180 milliseconds and thus, if uninterrupted, the MVC multivibrator will run free with a period of oscillation equal to 540 milliseconds. However, upon each enabling of monopulser MPB, a synchronization pulse is fed directly from MPB monopulser via conductor A2 to the MVC multivibrator circuit. The initial synchronization pulse from monopulser MPB is absorbed by multivibrator MVC, but each succeeding such pulse recycles MVC. Thus, if the repetition rate of monopulser MPB (which follows MPA) approaches 500 milliseconds, or a multiple thereof, the MVC multivibrator will lock itself to the repetition rate of the incoming signal. The enabling of multivibrator MVC starts sequential operations of the gate controlling monopulsers MPD and MPE (the positive going slope, i.e., the trailing edge of the pulse may advantageously be used for triggering purposes).

Each of the coincidence gates AG, RG, or BG is arranged to conduct whenever ground potential is removed from all of their inputs and if at least one of the inputs acquires a negative potential in excess of a given value which may, for example, be six volts. As will be more apparent from that which is contained hereinafter, the respective gates are activated sequentially for a limited period of time by means of a monopulser chain comprising monopulsers MPD and MPE.

It is believed that a more thorough understanding of the exemplary embodiment will be facilitated by reference to FIG. 2 in addition to FIG. 1, in conjunction with the following description which will assume that a single signal impulse of sufficient duration to pass through pulse length check circuit 103 triggers monopulser MPA at time ZERO.

(1) Time 0.—Monopulser MPA generates one negative pulse 20 ms. long and applies it simultaneously to one of the inputs of each of the coincidence gates AG, RG, and BG. All other gate inputs remain at ground potential. No coincidence is possible at this time.

(2) +20 ms.—Monopulser MPA is enabled and generates a 15 ms. long negative pulse. All gate inputs remain at ground potential. Multivibrator MSC is activated by the trailing edge of the pulse. The sync pulse from monopulser MPB is absorbed.

(3) 0+20+15 ms.—Multivibrator MVC starts and removes ground potential from the C1 lead for 360 ms. Gate AG is thus unblocked. Gates RG and BG remain blocked by the ground potential on leads D1 and E1, respectively.

(4) 0+20+15+360 ms.—Multivibrator MVC begins its second half cycle of operation thus grounding the C1 lead for 180 ms. and simultaneously triggering monopulser MPD which thereupon unblocks gate RG for 180 ms. Gate AG is blocked by ground potential present on the C1 lead. Gate BG remains blocked by ground on the E2 lead.

(5) 0+20+15+360+180 ms.—Multivibrator MVC starts second cycle of operation. Monopulser MPD recycles thus returning ground potential to lead D1 and triggering monopulser MPE which, in turn, transfers ground potential from lead E2 to lead E1 for 600 ms. Gate AG is thus unblocked for 360 ms. Gate RG is blocked by ground potential on lead D1 and E1. Gate BG is blocked by ground on lead D1.

(6) 0+20+15+360+180+360 ms.—Free running multivibrator circuit MVC goes into its short (180 ms.) half cycle thereby triggering monopulser MPD which removes ground from lead D1. Gate BG is thereupon unblocked. Gates AG and RG are blocked by grounds on leads C1 and E1, respectively.

Summarizing the operation of the embodiment over two complete cycles of the multivibrator circuit MVC output, it is noted:

(a) No coincidence is possible during the first 35 ms.;

(b) Audible announcements detection gate AG is primed for operation in the time intervals from 35 to 395 ms. and from 575 to 935 ms. subsequent to time ZERO. An examination of FIG. 2 reveals that approximately 65% of the over-all circuit detection time is available to provide an audible announcement indication;

(c) Reorder gate RG is primed for operation during the time interval from 395 ms. to 575 ms. subsequent to time ZERO. Thus, it is obvious that, although ideally a reorder signal is manifested by an impulse signal every 500 ms., as a practical matter gate RG will be enabled even where the incoming signal deviates substantially from 500 ms. intervals; and (d) Busy detection gate BG is primed in the time interval from 935 to 1175 ms. subsequent to time ZERO. In this latter case, in similar fashion to that set forth for the detection of a reorder signal, substantial allowance is thus made for deviations from the ideal impulse signal occurring at 1000 ms. intervals.

Reorder (120 i.p.m.) detection

Whre a reorder signal is encountered, the output of monopulser MPA will consist of a series of pulses spaced approximately 500 ms. apart. The first pulse initiates operation of the various components of the embodiment as previously described. The second pulse arrives in the time slot when gate RG is unblocked thus enabling that gate and operating relay 2RO. The earlier desribed sync pulse from monopulser MPB causes multivibrator circuit MVC to recycle "prematurely," thus locking multivibrator MVC to the incoming frequency of interruptions, thereby insuring that all subsequent pulses in the series will fall into the proper time slot. The operation of the 2RO relay removes ground from the guard timer circuit 201, thereby enabling that circuit to commence a two-cycle timing interval. Relay 2CT will thus operate and connect ground to the external circuit only if the announcement gate AG is not enabled within the two-second guard interval, viz., only if make contact 2ANN–1 is not enabled during this interval.

Busy tone (60 i.p.m.) detection

The output of monopulser MPA consists of a series of pulses spaced approximately 1000 ms. apart. The first pulse initiates operation of the various circuit components as earlier described. The second pulse arrives in the time slot when only the BG gate is primed thus enabling that gate and operating relay 2BY. The sync pulse from monopulser MPB locks multivibrator MVC to the incoming frequency of interruptions as above set forth. The operation of the 2BY relay is also checked by the two second delay period provided by guard timer 201 as above set forth.

Audible announcement detection

The output of monopulser MPA comprises a series of randomly spaced pulses (approximately one pulse for each syllable), the first pulse initiates the operation of various circuit components as earlier set forth. The second pulse, however, may arrive at any point in time subsequent to the first pulse since the spacing the pulses is inherently random. The several possible conditions which may occur are considered separately as follows:

(a) First two pulses spaced by less than 395 ms.—The second pulse finds gate AG unblocked and causes operation of relay 2ANN. An immediate indication is thus provided to the external circuit. The enabling of make contact 2ANN–1 provides a blocking ground to the two second guard timer 201, thereby preventing false reorder or busy indications which would be caused if some of the following pulses fall into other coincidence slots.

(b) First two pulses spaced by 395 to 575 ms.—Under such condition, reorder gate RG will be enabled and the 2RO relay will operate. As earlier set forth, however, the operation of the 2RO relay will not be recognized by the external circuit unless relay 2CT is enabled. As also described earlier, the operation of relay 2RO will enable guard timer circuit 201 to begin the two second timing interval. However, during the interval in which guard timer circuit 201 is operating, one of the randomly spaced pulses following the first pair of pulses will fall into a time slot suitable to provide an audible announcement coincidence. As earlier noted, 65% of the available time is used for this purpose. Upon the occurrence of the aforesaid pulse, the AG gate is enabled resulting in the operation of the 2ANN relay. Guard timer circuit 201 is immediately disabled as earlier described.

(c) First two pulses separated by 575 to 935 ms.—Under this condition, the announcement detection wil lbe accomplished immediately as set forth in (a) above.

(d) First two pulses separated by 935 to 1175 ms.—Under this condition, detection of an audible announcement is accomplished in the same manner as set forth in part (b) above with the exception that the 2BY relay operates falsely instead of the 2RO relay.

Output indication to the external circuit

As shown on FIG. 1, three leads are provided which are connectable to an external circuit. As earlier set forth the external circuit may comprise any number of configurations which require, for one purpose or another, a determination as to the particular call progress signal which has been encountered.

Thus, upon the enabling of the 2RO or 2BY relay, the respectively designated lead will have ground present thereon; assuming, of course, the enabled condition of the 2CT relay which, as hereinbefore set forth, provides a guard interval to insure the validity of the output indication. Similarly, the operation of the 2ANN relay during the released state of the 2CT relay provides an audible announcement indication to the external circuit.

Summary

While the equipments of this invention have been described with reference to a particular embodiment whereby a tone detector circuit is provided for detecting call progress signals in a manner independent of any aspect of the signal other than the over-all length of the tone structure, it is to be understood that such an embodiment is intended merely to be illustrative of the principles of the invention and that numerous other arrangements may be devised by those skilled in the art without departing from the spirit and scope of the invention.

What is claimed is:

1. In a circuit for detecting telephone call progress instructions each comprising a series of electrical signals of varying duration and varying frequency wherein said signals are either periodic or aperiodic events, means responsive to the reception of a first series of said signals for generating pulses of constant width at repeated intervals of time corresponding to the repetition rate of the signals in said first series, means responsive to the reception of the first one of said pulses of constant width for generating a plurality of enabling signals in predetermined sequence, first means responsive to the concurrent reception of one of said enabling signals and one of said pulses of constant width for determining that said first series comprises aperiodic signals, second means responsive to the concurrent reception of another of said pulses of constant width and another of said enabling signals for determining that said first series comprises periodic signals, indicating means controlled by said first and second means, and delay means operative only in response to the enabling of said second means for inhibiting the operation of said indicating means for a predetemined interval of time.

2. In a circuit for detecting and indicating the periodicity or aperiodicity of a recurrent audio frequency signal, means for converting said recurrent signal into a corresponding series of uniform direct current pulses, periodic indicating means comprising first output signal means, aperiodic indicating means comprising second output signal means, means responsive to a first one of said direct current pulses for partially enabling said periodic indicating means and said aperiodic indicating means in sequence, means responsive to the reception of a succeeding one of said direct current pulses for alternatively enabling said periodic indicating means and said aperiodic indicating means, and means responsive to the enabling of said periodic indicating means for enabling said first output signal means after a predetermined interval of time.

3. The combination set forth in claim 2 further comprising means responsive to the enabling of said aperiodic indicating means during said predetermined interval of time for inhibiting said first output signal means, and means for enabling said second output signal means.

4. The combination set forth in claim 2 further comprising means responsive to the enabling of said first output signal means for disabling said second output signal means.

5. In a circuit for detecting and identifying telephone call progress instructions comprising a series of audio frequency signals, the combination of means for amplifying and rectifying said series of signals, means for translating said rectified series of signals into a series of pulses each of uniform amplitude and each of a duration corresponding to the duration of the respective signal in said rectified series, means for rejecting all said translated pulses of less than predetermined duration, means responsive to each said unrejected pulse for generating a pulse of uniform amplitude and uniform duration, first means responsive to a first one of said pulses of uniform amplitude and uniform duration for transmitting in repeated cyclical succession an output of one polarity for an initial interval of time and an output of opposite polarity for a succeeding interval of time, and means responsive to the enabling of said generating means during said initial interval of time for indicating a particular call progress instruction.

6. The combination set forth in claim 5 further comprising second means responsive to said output of said opposite polarity for transmitting in repeated cyclical succession an output of a first polarity for an initial interval of time and an output of a second polarity for a succeeding interval of time, and means responsive to the enabling of said generating means during said second means initial interval for indicating another call progress instruction.

7. The combination set forth in claim 6 further comprising third means operative in response to said output of said second polarity for transmitting an output of uniform amplitude and polarity for a predetermined interval of time, and means responsive to the enabling of said generating means and the enabling of said third means during said second means initial interval for indicating a different call progress instruction.

8. The combination set forth in claim 7 further comprising means for inhibiting said other call progress instruction indicating means during the enabled condition of said third means.

9. The combination set forth in claim 5 further comprising means for inhibiting said particular call progress indicating means only during each said succeeding interval of said enabled first means.

10. The combination set forth in claim 5 wherein said first means comprises means responsive to each succeeding pulse of uniform amplitude and uniform duration occurring during said first means succeeding interval for recycling said first means.

References Cited

UNITED STATES PATENTS 3,270,143 8/1966 Germond et al.

KATHLEEN H. CLAFFY, *Primary Examiner.*

W. A. HELVESTINE, *Assistant Examiner.*